Jan. 24, 1928. 1,657,103

C. BERGER

CURRENT FLOW INDICATOR

Filed Dec. 23, 1921

Inventor
Christian Berger
Cooper Kerr & Dunham
Attorneys

Patented Jan. 24, 1928.

1,657,103

UNITED STATES PATENT OFFICE.

CHRISTIAN BERGER, OF NEW YORK, N. Y.

CURRENT-FLOW INDICATOR.

Application filed December 23, 1921. Serial No. 524,374.

This invention relates to the application of so-called thermoscopic substances for indicating visually by readable characters temperature conditions and conditions which are a function of temperature, such as flow of current in an electric circuit.

At the present time a demand has arisen for a simple form of current indicator which will be readily applicable to various forms of electric appliances and more particularly household appliances, automobile appliances and accessories and the like. With devices of this sort it is frequently desirable to know whether or not current is flowing there-through, and it is not necessary or essential to know the quantity of current flowing. On account of the relatively low cost of the appliances themselves the use of ammeters for this purpose is impracticable, and therefore simpler forms of magnetic indicators have been devised.

While some of these indicators have partially met the demand, their cost has been excessive and their construction in a way complicated in that they have not come into general use.

In the present invention, magnetic type devices and moving parts are entirely eliminated and in place thereof I utilize a thermoscopic material which is adapted to change in color under varying degrees of heat and thereby visually indicate the absence or presence of heat. By suitably associating the carrier of the thermoscopic material or the material itself with a heating element disposed in any electric current I may directly indicate the flow or nonflow of current in said circuit.

Provision is also made for directly displaying suitable words which indicate the on or off condition of the current or normal or elevated temperature condition. The words may be so arranged as to merely indicate that current is flowing with no indication being displayed with current "off", or the indication can be arranged to indicate both "on" and "off" conditions of current flow.

While the present indication in its more limited aspects is directed to current indicators, the principles and parts employed may be employed for other uses which will be readily apparent.

Substances have recently been developed which have the property of changing in color under the influence of heat. Among these may be mentioned copper mercury iodide which is adapted at temperatures between 130°–140° F. to change in color from cinnabar to chocolate brown. Silver mercury iodide changes color at lower temperature from yellow to orange. The color contrasts with this material may be increased by adding a blue dye or color to the material which will cause the color to be normally green and change under heat to deep red.

Figure 1:
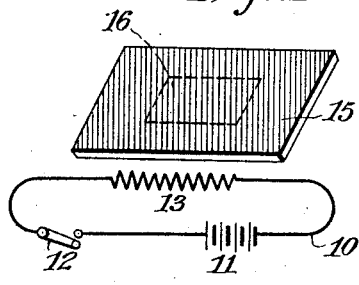
Fig. 1 is a diagrammatic view of one embodiment.

One method of carrying out my invention is shown in Fig. 1. In this figure 10 represents an electric circuit with a suitable source of current 11 and a manually operable switch 12. 13 represents a heating element which forms a part of the circuit 10. The conductor may be properly proportioned to heat up at a desired point. Disposed adjacent the portion of the conductor which becomes heated is a panel 15 of any desired material, carrying thereon a quantity of a thermoscopic substance at 16. The methods of applying the material may be widely varied. A sheet of paper or other material can be employed for the panel and the thermoscopic substance applied by painting or stenciling or in other ways as by a thin slip of paper impregnated with the thermoscopic substance. The operation will be readily understood. Under heat due to the flow of current the material will change color and indicate the flow of current.

Figure 2:
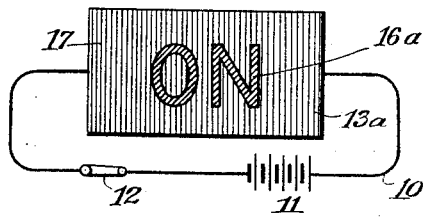
Fig. 2 is a view of a modified form of the invention.

Fig. 2 shows a different embodiment in which the heating element 13ª itself forms the panel which carries thermoscopic material 16ª. In this embodiment I have shown the thermoscopic material arranged in the form of the letters ON. To change the display when current is off I provide a background 17 around the letters which is of substantially the same color as that of the cold color of the thermoscopic material forming the letters. Under relatively cold conditions with current "off" in the circuit, the letters on will merge with the background and be invisible. On the other hand, when current flows and the material heats up the color of the letters will contrast with the background and therfore be rendered visible. The particular method of forming the background may be widely varied. Paint of proper color may be applied directly to the panel or a colored screen may be used. Similarly the thermoscopic material may be applied in any desired manner. The principles explained in connection with this figure may also be used in the embodiment shown in Fig. 1.

Figure 3:
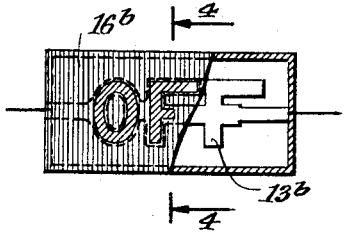
Figs. 3 and 4 are plan and sectional views of a different indicating and heating element in which the latter conforms to the configuration of the former.
Figure 4:

Figs. 3 and 4 illustrate an embodiment in which the heating element 13$^b$ is arranged to conform to the configuration of the letters. Here I have shown the letters UFF. In this case the thermoscopic letters 16$^b$ are of contrasting color with respect to the background 17 when the parts are cold and no current is flowing. Thus I obtain a direct indication of the "off" condition and the user will know that current flow is taking place when the letters are invisible.

Figure 5:
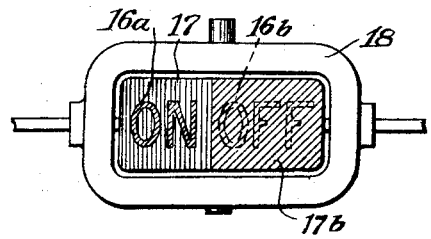
Fig. 5 shows another embodiment of my invention.
Figure 6:
Fig. 6 shows the indicating elements of Fig. 5 under a different condition of current flow.

In Figs. 5 and 6 I have shown a combination of the on and off letters. The indicator is here shown mounted upon a cut-out switch 18 of conventional form. It will be understood that the indicator may be mounted upon a piece of apparatus itself or upon an attachment plug or in any desired position. Preferably the indicator when mounted upon a part such as 18 is so disposed that air may freely circulate around it so that it will cool rapidly upon the interruption of current flow.

In Fig. 5 the words ON as shown at 16ª are shown in contrasting relation with the background 17. The letters OFF marked 16$^b$ are in non-contrasting relation with background portion 17$^b$. When current is turned off the display will be as shown in Fig. 6, with the words 16$^b$ contrasting with a background 17$^b$ and thereby visible and the word ON marked 16ª in non-contrasting relation and therefore invisible. On the other hand, as current is "on" the indication will be given as shown in Fig. 5.

It will be understood that similar indications may be secured by making the background portions of thermoscopic material and the letters of properly colored non-thermoscopic material.

Figure 7:
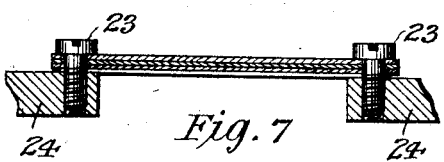
Fig. 7 is a sectional view of another form of heating element and indicator.
Figure 8:
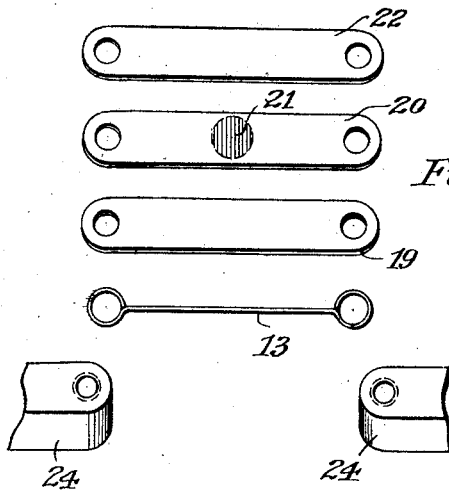
Fig. 8 is a disassembled view of the parts shown in Fig. 7.

In the embodiment shown in Figures 7 and 8, I provide a structure which will prevent the overheating of the thermoscopic substance when the current is in "on" condition. Such substances, as is well known, are not stable under excessive continued heat and I therefore provide heating element 13 and cover the same with a suitable metal plate 19, preferably enamel to insulate the same. This plate is preferably of aluminum and acts as a radiator to dissipate the heat from the concentrated point of heat adjacent the heating element 13. Superimposed over this plate is a carrier 20 for the thermoscopic substance 21 and superimposed and protecting this part is a suitable sheet of transparent mica 22. The member 20 may be conviently formed of tinted mica to provide the background for the thermoscopic substance which is indicated diagrammatically at 21. This thermoscopic substance may be of any of the forms of letters shown in the other embodiments in the invention. The parts shown in Figure 8 are all assembled together by means of screws 23 which are received in suitable terminal blocks 24. It will be understood that the background portion may be tinted in the material forming the covered mica 22, if desired. With this embodiment excessive heating of the thermoscopic substance indicated at 21 is avoided.

What I claim is:

A current flow indicator comprising differently disposed masses of thermoscopic materials, and means for heating the same by the flow of current, one of said materials being adapted to give a visual indication of one flow condition and the other material being concurrently invisible, said respective masses of thermoscopic materials upon a different condition of current flow being adapted to respectively become invisible and visible and thereby directly indicate another current flow condition.

In testimony whereof I hereto affix my signature.

CHRISTIAN BERGER.